Patented Sept. 18, 1934

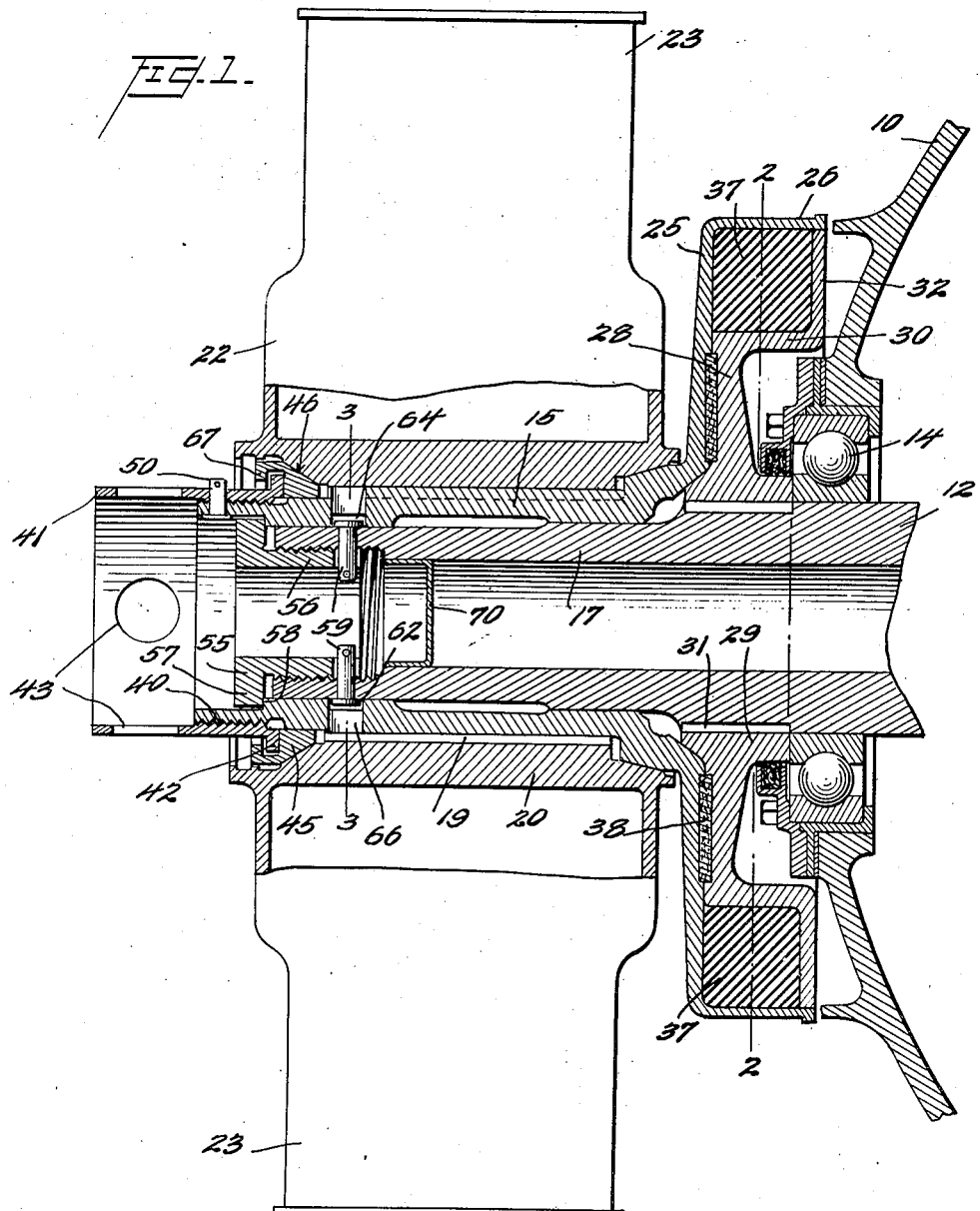

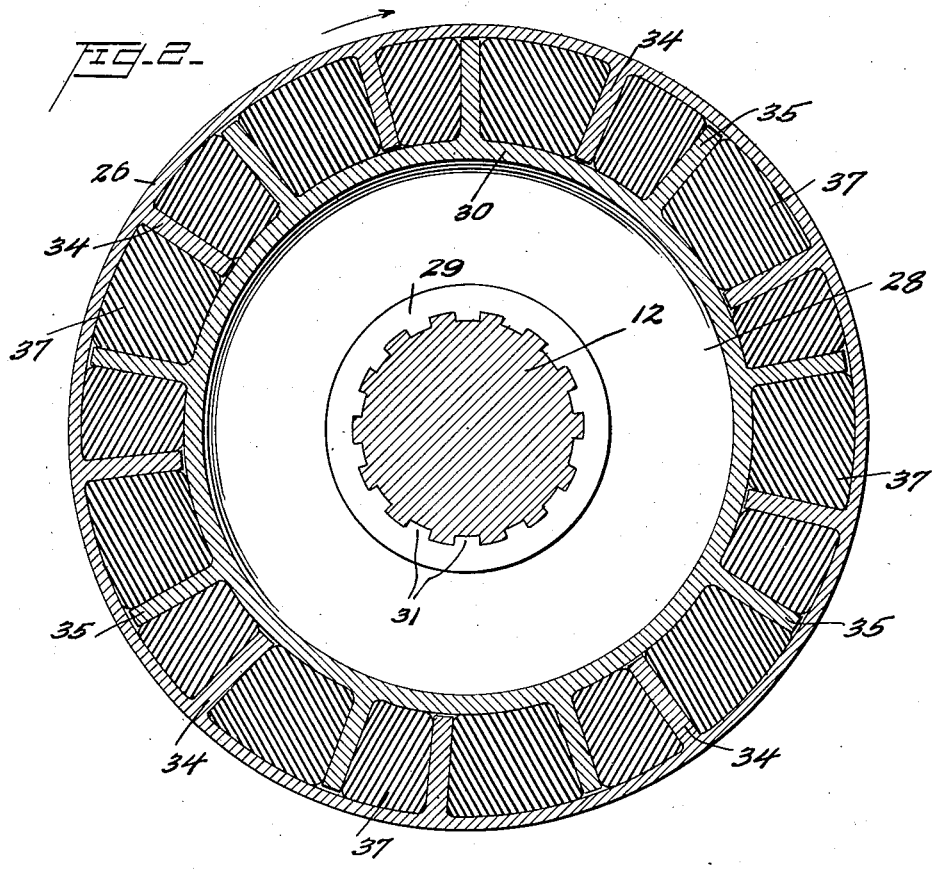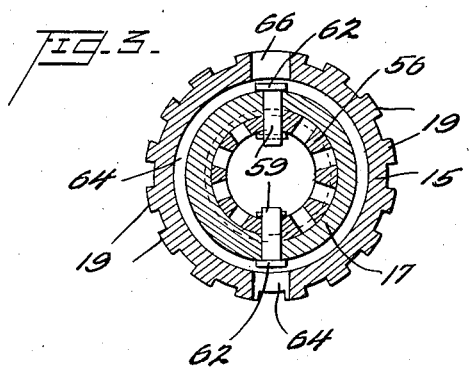

1,974,356

UNITED STATES PATENT OFFICE 1,974,356

PROPELLER DRIVE

Herbert C. Edwards, Detroit, Mich., assignor to Packard Motor Car Company, Detroit, Mich., a corporation of Michigan Application December 8, 1931, Serial No. 579,813

13 Claims. (Cl. 170—177)

This invention relates to mountings for aircraft propellers and has for its object the provision of means for introducing sufficient resilience in the driving connections for the propeller to effectively cushion the direct shock loads.

While it is common practice to mount propellers directly on the crankshafts of aircraft engines, it is desirable to operatively connect the propeller to the shaft through yielding means. Since the propeller represents a considerable portion of the mass of the system, a yielding connection between the propeller and the shaft permits the propeller to lag behind the shaft during moments of peak torque, so that the acceleration thereof is slower, thus greatly reducing the inertia stresses which would otherwise be impossible upon the shaft. After the moment of peak pressure has passed, a part of the energy absorbed or stored in the yielding connection is returned to the shaft system and the flow of energy from the shaft to the propeller is thus made smoother. At the same time, the increase in the resilience of the entire system afforded by such a yielding connection, as in any other vibratory system, tends to lower the position in the engine speed range at which resonant vibrations occur and excessive vibration at high speed may thus be definitely avoided.

Furthermore, the propeller acts as an inertia mass in an ordinary vibration damper when thus resiliently connected to the shaft, and a portion of the energy of vibration may be absorbed to prevent the building up of vibrational disturbances to an appreciable extent.

It is a feature of the present invention that the elastic connection between the propeller and the crankshaft may include a rubber member or members, the rubber being alternately compressed and expanded in response to the impulses applied to the shaft. Since rubber exhibits a very considerable amount of internal friction, torsional vibrations induced in the shaft by the periodic impulses applied thereto are dissipated by the conversion of the energy of vibration into heat within the rubber.

It is one of the principal objects of the present invention to provide a mounting for a propeller including a yieldable connection to the shaft which will accommodate a standard type of propeller hub, so that the necessity for altering the construction of the propeller hub in applying the latter to the shaft may be avoided.

Further features and objects of the invention will be apparent from the following description taken in connection with the accompanying drawings, in which Figure 1 is a vertical sectional view through a propeller hub and a crankshaft on which the hub is mounted and connected to the shaft in accordance with the principles of the invention;

Figure 2 is a transverse sectional view on the line 2—2 of Figure 1; and

Figure 3 is a section on the line 3—3 of Figure 1.

It will be understood that one embodiment of the invention is described in detail herein to facilitate an understanding of the underlying principles, but that various alterations and changes are contemplated, there being no intention to limit the invention by the specific nature of the following description.

Referring more specifically to the drawings, it will be observed that the reference numeral 10 designates a portion of the crankcase of an aircraft engine. This engine may be of the well known radial type operating on the Diesel cycle to which the invention is found particularly applicable by reason of the high instantaneous torsional stresses developed in such engines. The crankshaft 12 of the engine is journalled in suitable bearings 14 located in the opposite walls of the crankcase.

A sleeve 15 is fitted over a reduced forwardly extending portion 17 of the crankshaft 12 so as to be freely rotatable thereon, this sleeve having splines 19 formed on its outer peripheral surface arranged to interlock with corresponding splines formed on the interior of a centrally located bearing portion 20 of the propeller hub 22. The latter is provided with the usual radially extending sockets 23 within which are fitted the blades (not shown) of the propeller in any conventional manner. The propeller hub 22 is of standard construction, for instance it may be designed in accordance with the S. A. E. standard #50.

An annular member 25, preferably formed integrally with and extending radially outward from the rearward end of the sleeve 15, is provided with a further circumferentially disposed portion 26 to form a substantially cup-shaped housing. An annular member 28 having a hub portion 29 splined as at 31 to the crankshaft is provided with a circumferentially extending portion 30 and a radially extending portion 32 which cooperate with the housing member 25, 26 to form an annular enclosure, which may be substantially rectangular in cross-section as shown in the drawings. The enclosure thus formed is separated into a plurality of compartments by means of radially disposed webs 34 and 35, the webs 34 being preferably formed integrally with the portions 25 and 26 of the member carried by the sleeve 15, and the webs 35 being formed integrally with the portions 30 and 32 of the member 28 carried by the shaft. Within the annular enclosure and interposed between the webs 34 and 35 are arranged a plurality of resilient blocks 37, preferably of rubber or other imperfectly elastic material and tending to develop internal friction when compressed.

Under some circumstances it is found that the amount of energy absorbed by the compression of rubber in the manner hereinbefore described is not sufficient to entirely damp the vibrations induced in the crankshaft. For this reason it is preferred to provide an annular disc 38 of friction developing material between the relatively movable members carried by the sleeve and shaft. In the present instance this disc is shown as inserted in annular recesses formed in the cooperating faces of the members 25 and 28.

It will be observed from the construction thus far described that torque applied to the crankshaft 12 will be transmitted through the member 28, the webs 35, the blocks 37, the webs 34, and the member 26, 25 to the sleeve 15 and thence to the propeller hub 22. A yielding connection is thereby afforded between the crankshaft and the propeller which will serve not only to equalize the torque transmitted to the propeller by the absorption of sudden shocks, but will damp to a considerable extent the vibrations arising in the crankshaft by the conversion of the energy of such vibrations into heat within the deformable blocks 37.

The extreme forward end of the sleeve 15 is externally threaded as indicated at 40 to receive a nut 41 having an annular flange 42 on one end thereof and provided with apertures 43 through which a tool may be inserted to thread the nut inwardly on the sleeve 15. A thrust member 45 is interposed between the flange 42 of the nut 41 and the bearing portion 20 of the propeller hub, the latter being formed with a conical surface 46 arranged to engage a similar surface on the member 45. In the same manner cooperating conical surfaces are formed adjacent the rearward side of the propeller hub between the sleeve 15 and the bearing member 20 of the hub, so that the hub may be firmly clamped in position on the sleeve 15 by tightening the nut 41, the cooperating bevelled or conical surfaces serving to wedge the hub securely in place on the sleeve.

In order to secure the nut 41 in the position to which it is adjusted, pins 50 may be passed through corresponding apertures in the nut 41 and the sleeve 15. It is of course necessary to prevent the sleeve 15 from sliding forwardly off the end of the crankshaft 12 and this may be conveniently prevented by the provision of a nut 55 having a portion 56 threaded within the end of the crankshaft and provided with a flange 57 engaging an annular shoulder 58 on the sleeve 15. The nut 55 may be retained in position by means of pins 59 extending through corresponding apertures and slots in the crankshaft 17 and nut 55 respectively. The heads 62 of the pins 59 are disposed in an annular groove 64 formed in the interior of the sleeve 15, and apertures 66 communicating with the groove 64 extend through the sleeve 15 to permit insertion of the pins 59.

If desired the member 45 may be formed with an annular lip 67 arranged to be engaged by the flange 42 as the nut 41 is threaded off the sleeve 15 so that the member 45 may be readily withdrawn to permit removal of the propeller hub 22 for replacement or repair. The member 45 may be formed in sections or split to permit assembly on the flange 42 of the nut 41. The interior of the crankshaft may be closed by means of a plug 70 fitting in the end thereof so that oil for lubrication of the engine may be retained within the crankshaft.

It will be observed that the arrangement disclosed herein affords an extremely compact and simple mounting for a standard propeller hub. If desired the entire mounting may be supplied as a unit including the sleeve 15, the member 28, and the deformable blocks enclosed therebetween, this unit being very readily assembled and disassembled from the propeller shaft. In order to remove the mounting it is only necessary to withdraw the pins 50, unscrew the nut 41 from the sleeve 15, thereby withdrawing the member 45, slide the propeller hub 22 off the end of the sleeve 15, withdraw the pins 59, and unscrew the nut 55. The sleeve 15 and member 28 may then be slid from the end of the shaft.

The propeller hub may be similarly readily mounted on the crankshaft by assembling the parts just enumerated in the reverse order, each component part of the assembly being positively retained against displacement so that failure which might result from loosening of the propeller or any portion of the assembly is definitely prevented.

Having thus described the invention, what is claimed as new and desired to be secured by Letters Patent is:

1. In an aircraft propulsion unit, the combination with an engine crankshaft, of a sleeve rotatably mounted on said crankshaft, a resilient driving connection between said sleeve and crankshaft, a propeller hub supported on said sleeve and having a splined connection therewith, and means associated with said sleeve and hub for preventing relative displacement thereof longitudinally of said crankshaft.

2. In an aircraft propulsion unit, the combination with an engine crankshaft, of a sleeve rotatably mounted on said crankshaft, a resilient driving connection between said sleeve and crankshaft, a propeller hub supported on said sleeve and having a splined connection therewith, and means associated with said crankshaft and sleeve for preventing longitudinal displacement of said sleeve on said crankshaft.

3. In an aircraft propulsion unit, the combination with an engine crankshaft, of a sleeve rotatably mounted on said crankshaft, a resilient driving connection between said sleeve and crankshaft, a propeller hub supported on said sleeve and having a splined connection therewith, and a member having threaded connection with said sleeve and engaging said hub to prevent relative longitudinal displacement of said sleeve and hub outwardly of said crankshaft.

4. In an aircraft propulsion unit, the combination with an engine crankshaft, of a sleeve rotatably mounted on said crankshaft, a resilient driving connection between said sleeve and crankshaft, a propeller hub supported on said sleeve and having a splined connection therewith, and a member having threaded connection with said crankshaft and engaging said sleeve to prevent outward longitudinal displacement of said sleeve on said crankshaft.

5. Means for mounting a propeller hub on a crankshaft comprising a sleeve rotatably mounted on an end portion of the crankshaft and received within said hub, a resilient connection between said crankshaft and sleeve, said sleeve having a portion thereof disposed for engagement with one side of said hub to prevent movement of said hub longitudinally of said sleeve in one direction, a member threaded on said sleeve for engagement with the other side of said hub to prevent movement of said hub longitudinally of said sleeve in the other direction, means for operatively connecting said hub to said sleeve, and means for operatively connecting said sleeve to said crankshaft.

6. Means for mounting a propeller hub on a crankshaft comprising a sleeve adapted to be rotatably mounted on an end portion of the crankshaft and to be received within said hub, said sleeve having a portion thereof disposed for engagement with one side of said hub to prevent movement of said hub longitudinally of said sleeve in one direction, a member threaded on said sleeve for engagement with the other side of said hub to prevent movement of said hub longitudinally of said sleeve in the other direction, means for operatively connecting said hub to said sleeve, and means for operatively connecting said sleeve to said crankshaft, said last named means including a resilient member.

7. An assembly for mounting a standard propeller hub on a crankshaft, comprising a sleeve having an internal bearing portion having a rotatable fit on one end of the crankshaft and having an external surface fitting within said hub, and resilient means carried by said sleeve and adapted to be connected with said crankshaft, said resilient means including a flanged member integral with said sleeve, a flanged member for attachment to said crankshaft, and deformable means interposed between said flanged members.

8. An assembly for mounting a standard propeller hub on a crankshaft, said hub having an internal substantially cylindrical bearing portion provided with outwardly flared conical seats at each end thereof, comprising a sleeve fitting rotatably over an end portion of the crankshaft, said sleeve having an external surface fitting within the bearing portion of said hub and having a conical portion for engagement with one of the conical seats on said hub, means having threaded engagement with said sleeve and having a conical portion for engagement with the other of said conical seats on said hub, whereby said hub may be wedged firmly in position on said sleeve, and resilient means for operatively connecting said sleeve to said crankshaft.

9. An assembly for mounting a standard propeller hub on a crankshaft, said hub having an internal substantially cylindrical bearing portion provided with outwardly flared conical seats at each end thereof, comprising a sleeve adapted to fit rotatably over an end portion of the crankshaft, said sleeve having an external surface fitting within the bearing portion of said hub and having a conical portion for engagement with one of the conical seats on said hub, means having threaded engagement with said sleeve and having a conical portion for engagement with the other of said conical seats on said hub, whereby said hub may be wedged firmly in position on said sleeve, and means including an imperfectly elastic member for operatively connecting said sleeve to said crankshaft.

10. A device for resiliently connecting a propeller hub to a crankshaft, comprising a sleeve adapted to fit within the hub and over the crankshaft, said sleeve having a radially extending flanged portion, a member adapted to be connected to the crankshaft and having a radially extending flanged portion cooperating with the flanged portion of said sleeve to form a housing, and resilient means operatively interposed between said flanged portions of said member and sleeve.

11. An assembly for mounting a standard propeller hub on a crankshaft, said hub having an internal substantially cylindrical bearing portion provided with outwardly flared conical seats at each end thereof, comprising a sleeve fitting rotatably over an end portion of the crankshaft, said sleeve having an external surface fitting within the bearing portion of said hub and having a conical portion for engagement with one of the conical seats on said hub, means having threaded engagement with said sleeve and having a conical portion for engagement with the other of said conical seats on said hub, whereby said hub may be wedged firmly in position on said sleeve, means having threaded engagement with said crank shaft and engaging said sleeve for retaining said sleeve against endwise displacement from said crankshaft, and resilient means for operatively connecting said sleeve to said crankshaft.

12. In an aircraft propulsion unit, the combination with an engine crankshaft, of a sleeve rotatably mounted on said crankshaft, a resilient driving connection between said sleeve and crankshaft, said connection including deformable means developing appreciable internal friction on deformation thereof, a friction connection between said sleeve and said crankshaft, and means associated with said sleeve for effecting a non-rotatable connection between the sleeve and a propeller hub.

13. In an aircraft propulsion unit, the combination with an engine crankshaft, of a sleeve rotatably mounted on said crankshaft, a resilient driving connection including a rubber member between said sleeve and crankshaft, a friction connection between said sleeve and crankshaft, and means associated with said sleeve for effecting a non-rotatable connection between the sleeve and a propeller hub.

HERBERT C. EDWARDS.